UNITED STATES PATENT OFFICE.

WALTER BURNHAM, OF HYDE PARK, ILLINOIS.

MOLDING VISCOUS METALS.

SPECIFICATION forming part of Letters Patent No. 383,039, dated May 15, 1888.

Application filed October 3, 1887. Serial No. 251,324. (No model.)

*To all whom it may concern:*

Be it known that I, WALTER BURNHAM, of Hyde Park, Illinois, have invented a certain Improvement in Molding Viscous Metals, of which the following is a specification.

This improvement relates to a method of molding metals having high melting-points, by which such metals are made to acquire increased toughness, tensile strength, better molecular cohesion, and other useful properties.

The invention consists in heating the object under treatment up to a temperature short of the melting-point, but at which the metal of which such object is composed becomes highly viscous, and in then subjecting such object to continuously-exerted strong pressure while it is confined in a mold, and while it is cooling down from the temperature of viscosity to the temperature at which it may, without injury, be relieved from pressure preparatory to its removal from the mold.

By the term "highly viscous" is meant a condition which exists only within a limited range of temperature below the melting-point, and in which the mass of metal is so affected that its molecules will submit to rapid motion upon each other, and will quickly cohere in their new relationships when such motion ceases.

This method of treatment may be applied to iron and steel with especially useful results. The high temperatures at which iron and steel acquire the desired condition of viscosity have heretofore been considered injurious; but by the confinement of the viscous mass in the mold, and its subjection to continuously-exerted high pressure until its temperature has fallen below the dangerous point, not only do no injurious effects ensue, but the necessarily-resulting increased density of the product is accompanied with increased molecular cohesion, tensile strength, toughness, and rigidity, and, in the case of steel, with an increased capacity to take temper without the usual loss of toughness. Owing to the plastic condition of the mass, its substance flows readily when subjected to pressure, and hence the mass acquires in reverse the shape of the mold in which it is confined. Therefore the process may be effectively employed not only, for example, upon an ingot of cast-steel for the purpose of removing any piping or blow-holes therefrom and welding it into a homogeneous body of steel possessing the useful properties accompanying the increased density which it thus acquires, but it may also be employed to impart a prescribed shape to the mass—as, for example, the finished shape of an ax, which has heretofore been usually imparted to the ax-blank by hammering or other forging. So employed, the process not only takes the place of forging, but imparts to the material of which the finished ax is composed the improved qualities described.

In view of the character of the process, and to distinguish it from casting or forging, the term "viscous molding" has been selected as a designation for it, especially because it is applicable to all metals which have a high melting-point, and which, when they are subjected to strong pressure while in a condition of viscosity produced by heating them up to high temperatures short of their melting-points, and are held under such strong pressure until their temperatures have fallen below the heat which is injurious to them, acquire increased hardness, rigidity, and toughness.

The desired viscous condition must be produced by gradually raising the temperature of the metal under treatment, and not by cooling it down from a molten state. By the time the interior of a molten mass of metal has cooled down to the temperature of viscosity its exterior portion is liable to have cooled down below that temperature. In the present process pressure must be continuously exerted while the metal is in the viscous state, and until it is cooled down to a low red heat. The shaping of the object and the movement of the molecules of the metal of which the object is composed are effected during the viscous state, in order to secure the perfect cohesion of the molecules, and it is essential that the pressure shall not be removed during the period while the metal, in cooling down, has such a temperature that if relieved from pressure it will "open up," as it is called. At a red heat the danger of opening up has ceased, and therefore at that heat the object under treatment may be safely relieved from pressure, so far as the danger of opening up is concerned. It is, however, also essential that the pressure shall be removed before the metal has cooled below a low red heat, because when below a low red heat the metal may be liable to crack under pressure.

The process may be usefully employed, if desired, in effecting the perfect welding to each other of several objects or blanks composed of the same metal, or composed, respectively, of different metals. For example, the several pieces of iron and the piece of steel of which an ax is composed may by this process be simultaneously united to each other with a perfect weld, and with beneficial effects upon both the iron and steel.

Heretofore it has been necessary to weld the iron pieces of an ax-pile to each other at one operation, and to weld the steel bit to the iron at another operation, because the temperature required for welding iron to iron is so high as to be injurious to the steel. By the present process no injury ensues during the simultaneous welding of all the pieces to each other, because the pile is held under continuously-exerted strong pressure until it is cooled down below the dangerous heat; and, as has been explained, the steel is especially improved by being made capable of taking the temper required for it without acquiring the degree of brittleness which is the usual accompaniment of that temper.

The process of viscous molding may also be usefully employed upon objects made of cast-iron or of wrought-iron. In both cases the final shape is given to the object treated, and the metal of which it is composed is rendered harder and tougher by reason of the increased cohesion of the molecules caused by their subjection to strong pressure while the mass under treatment is in a viscous state. A cast-iron blank heated to viscosity and subjected to pressure in dies readily takes the shape of the die; and the cast-iron, after subjection to the process, exhibits in its fracture changes similar to those exhibited by steel. Its crystals are smaller or finer, its strength is increased so that it will bend farther without breaking, and its surface becomes capable of taking a higher finish. These results, which are remarkable in cast-iron, (because it has heretofore been supposed that cast-iron could not be forged or changed in shape after it was cast,) are also produced by subjecting wrought-iron to the process of viscous molding.

In all cases the metal operated upon is made to approach to an amorphous condition. There is a diminution in the size of its particles, or greater "fineness," as it is called, an increase in its rigidity, toughness, and tensile strength. In the case of objects made of tool-steel, this increase in toughness is especially valuable, because while it is important that they should be capable of being tempered so that their cutting-edges may have the required hardness, it is a great advantage to avoid the brittleness which usually accompanies such hardness.

In carrying out the process it is preferred to use box or closed dies adapted to give in one operation approximately the finished form to the object acted upon. The operation of such dies must be by a continuously-exerted pressure, which may be secured by means of a hydraulic press. The desired result cannot be obtained by a percussive blow.

The blank or object, whatever it may be, which is to be operated upon, having been heated up to the viscous state, is placed in the dies, and by their immediate operation is quickly pressed into shape, the particles or molecules of metal being forced into their ultimate relationship while they are in a viscous condition, so that they weld perfectly to each other. By this process the shaping, or what would ordinarily be called the "forging," of the metal is to be completed by the time the metal has lost its viscous condition. Therefore the operating motion of the dies must be rapid, because the viscous condition is quickly lost, and the force with which they exert their pressure must not be great enough to alter the shape, or, in other words, to forge the metal after it has lost its viscous condition. The force which the dies are to exert is to be limited to that required for shaping or forging the metal in the viscous condition, in order to avoid any alteration of the relative positions or mutual relationship which the molecules or particles of metal have assumed or acquired during their viscous state. Subsequent disturbance of the relationship of the particles would only be possible by torsion and rupture, as in the ordinary process of forging, in which, after rupture, no new cohesions are established, because of the absence of the viscous condition, which makes immediate cohesion possible. The operating movement of the dies is intended to be arrested by the resistance to their movement, which the metal operated upon opposes when cooled below the prescribed viscous state. Therefore the dies are not to be permitted to acquire contact with each other, but must continue to deliver their pressure upon the object upon which they act, after it has cooled below the viscous temperature and until it has fallen to a heat at which it is no longer liable to open up, and therefore may be safely relieved from pressure. It will be found that a force insufficient to rupture metal which is at a forging heat will yet suffice to mold the metal into form, and properly condense it, if exerted while the metal is in the prescribed viscous state.

Extreme powers—as, for example, twenty tons to the inch of metal surface presented at a right angle to the direction of the die motion—are only necessary when the object operated upon is composed of tool-steel, and is to be compressed, say, in one-tenth of a second, to a thickness of, say, one-eighth of an inch.

The object subjected to the process of viscous molding, having been heated, molded, condensed, held under pressure, and released from the dies, as described, is subsequently to be treated as a completed casting or forging would be treated as to final tempering, grinding, and finishing.

What is claimed as the invention is—

1. In the art of metal-working, the process of viscous molding, which consists in heating the metallic object under treatment up to a temperature short of the melting-point, but at which the metal of which such object is composed acquires a viscous condition, as described, and in then immediately confining such object in a mold, and subjecting it to a continuously-exerted strong pressure while it is cooling down from the temperature of viscosity to a temperature at which it may be safely relieved from pressure preparatory to its removal from the mold.

2. The process of welding by viscous molding herein described, which consists in heating up to a viscous state the several metallic objects which are to be welded together, and in then immediately confining such objects in a mold, and subjecting them to continuously-exerted strong pressure while they are cooling down from the temperature of viscosity to a temperature at which they may be safely relieved from pressure preparatory to removal from the mold.

WALTER BURNHAM.

Witnesses:
M. L. ADAMS,
A. M. JONES.